US012673308B2

(12) United States Patent
Iwao et al.

(10) Patent No.: US 12,673,308 B2
(45) Date of Patent: Jul. 7, 2026

(54) STIRRING APPARATUS FOR FOODS

(71) Applicant: Sodick Co., Ltd., Kanagawa (JP)

(72) Inventors: Kenichi Iwao, Kanagawa (JP); Masato Taniguchi, Kanagawa (JP); Maiko Doda, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 922 days.

(21) Appl. No.: 17/864,339

(22) Filed: Jul. 13, 2022

(65) Prior Publication Data

US 2023/0083718 A1 Mar. 16, 2023

(30) Foreign Application Priority Data

Sep. 16, 2021 (JP) ................................. 2021-150958

(51) Int. Cl.
| | |
|---|---|
| *B01F 35/11* | (2022.01) |
| *A23L 7/113* | (2016.01) |
| *A23P 20/18* | (2016.01) |
| *B01F 29/60* | (2022.01) |
| *B01F 35/90* | (2022.01) |
| B01F 101/06 | (2022.01) |

(52) U.S. Cl.
CPC .............. *B01F 29/61* (2022.01); *A23L 7/113* (2016.08); *A23P 20/18* (2016.08); *B01F 35/11* (2022.01); *B01F 35/90* (2022.01); *A23V 2002/00* (2013.01); *B01F 2035/99* (2022.01); *B01F 2101/06* (2022.01); *B01F 2215/0422* (2013.01)

(58) Field of Classification Search
CPC ..... B01F 35/11; B01F 33/502; B01F 2101/06
See application file for complete search history.

(56) References Cited

U.S. PATENT DOCUMENTS

| | | | |
|---|---|---|---|
| 2020/0352193 A1 | 11/2020 | Cocchi et al. | |
| 2023/0061171 A1* | 3/2023 | Sijm | .......................... B65B 3/06 |

FOREIGN PATENT DOCUMENTS

| | | | | |
|---|---|---|---|---|
| CA | 2956940 A1 * | 8/2018 | .......... | B01F 33/4533 |
| CN | 106166551 | 11/2016 | | |
| CN | 106214018 | 12/2016 | | |
| CN | 106214018 A * | 12/2016 | .......... | A47J 43/0716 |
| CN | 106166551 B * | 11/2019 | .............. | B08B 3/08 |
| JP | S5682072 | 7/1981 | | |
| JP | H06125844 A * | 5/1994 | | |
| JP | H06181848 A * | 7/1994 | | |
| JP | H0838366 | 2/1996 | | |
| JP | 3260136 | 2/2002 | | |

(Continued)

*Primary Examiner* — Ibrahime A Abraham
*Assistant Examiner* — Hamzeh Hicham Amin
(74) *Attorney, Agent, or Firm* — JCIPRNET

(57) ABSTRACT

A stirring apparatus for foods includes an endless conveyer, a plurality of cups, and a rotation mechanism. The endless conveyer has a conveying surface circulating in an endless manner and is arranged to be inclined. The cups are attached to the endless conveyer to be perpendicular to the conveying surface. The rotation mechanism rotates the cups. The rotation mechanism includes a rotation shaft, a driven magnet, a driving magnet, and a rotation driving device. One end of the rotation shaft is fixed to a bottom plate of the cup. The driven magnet is provided at the other end of the rotation shaft. The driving magnet faces the driven magnet at a predetermined interval. The rotation driving device rotates the driving magnet.

10 Claims, 7 Drawing Sheets

(56)  References Cited

FOREIGN PATENT DOCUMENTS

| | | | | | |
|----|---------------|---|---|---------|------------------|
| JP | 2016135213 | | | 7/2016 | |
| JP | 2016135213 | A | * | 7/2016 | |
| JP | 2017086167 | A | * | 5/2017 | .............. A47J 27/18 |
| JP | 2020184991 | | | 11/2020 | |
| JP | 2021083536 | | | 6/2021 | |
| KR | 20110065671 | | | 6/2011 | |

* cited by examiner

STIRRING APPARATUS FOR FOODS

CROSS-REFERENCE TO RELATED APPLICATION

This application claims the priority benefit of Japan application serial No. 2021-150958, filed on Sep. 16, 2021. The entirety of the above-mentioned patent application is hereby incorporated by reference herein and made a part of this specification.

BACKGROUND

Technical Field

The disclosure relates to a stirring apparatus for foods. In particular, the disclosure relates to a stirring apparatus for noodles which stirs boiled noodles.

Related Art

When packaging boiled noodles in a product container, it is desirable to sprinkle the boiled noodles with a loosening agent composed of water, edible oils and fats, etc. in advance in order to prevent the boiled noodles from solidifying into lumps. A stirring apparatus for noodles has been disclosed to spray a loosening agent to boiled noodles and then stir the boiled noodles to uniformly adhere the loosening agent to the boiled noodles.

Japanese Patent No. 3260136 B1 discloses a stirring apparatus for noodles which mixes boiled noodles with a loosening agent. The stirring apparatus for noodles includes a support base arranged to be inclined, and a plurality of cups which are provided at predetermined intervals on the support base and into which the boiled noodles and the loosening agent are fed. The support base is rotated to position the cup, and the cup is rotated to stir and mix the boiled noodles and the loosening agent. After stirring, the cup is positioned at a predetermined discharge position, and the boiled noodles adhered with the loosening agent are discharged to the outside of the apparatus.

For the seasoning of boiled noodles, a stirring apparatus for noodles has been disclosed to supply seasonings and condiments to boiled noodles and then stir the boiled noodles to uniformly mix the boiled noodles with the seasonings and condiments.

Japanese Patent Application Laid-Open No. 2021-083536 A discloses a stirring apparatus for noodles which mixes boiled noodles with seasonings and condiments. The stirring apparatus for noodles includes a conveyer circulating in an endless manner (hereinafter referred to as an endless conveyer) as the conveyer of cups. A plurality of cups into which boiled noodles, sauces, and ingredients are fed are fixed at predetermined intervals to the endless conveyer which extends in the horizontal direction. The cup is conveyed intermittently, and the boiled noodles, the sauces, and the ingredients are sequentially fed. Then, the boiled noodles, the sauces, and the ingredients in the cup are stirred and mixed by a stirring rod and then discharged downward.

Regarding stirring of the boiled noodles, as respectively disclosed in Japanese Patent No. 3260136 B1 and Japanese Patent Application Laid-Open No. 2021-083536 A, a method of stirring by rotating the cup and a method of stirring by inserting a stirring rod into the cup and operating the stirring rod have been disclosed.

In the stirring apparatus for noodles disclosed in Japanese Patent No. 3260136 B1, the support base is rotated to position the cup. To increase the number of cups in such a stirring apparatus for noodles, the size of the support base must be increased. The enlarging the support base may result in increasing the size of the entire apparatus and increasing the load on the rotation shaft that pivotally supports the support base, so there is a design limit to the upper limit of the number of cups.

On the other hand, as in the stirring apparatus for noodles disclosed in Japanese Patent Application Laid-Open No. 2021-083536 A, when the endless conveyer is used as the conveying means of cups, it is relatively easy to increase the number of cups.

From the viewpoint of the stirring method, the method of stirring by rotating the cup is excellent in that the food ingredients do not get entangled with the stirring rod, the mechanism and control for stirring are relatively simple, and the maintainability is good. When the cup itself is rotated for stirring, it is conceivable to connect the cup with a rotation driving device in a non-contact manner by using a magnetic coupling. The magnet coupling includes a driven magnet and a driving magnet, and the driven magnet and the driving magnet need to be arranged to face each other at a predetermined interval. Specifically, by arranging the driven magnet on the cup and arranging the driving magnet at a position facing the driven magnet at a predetermined interval, the cup can be indirectly rotated by the magnetic force.

On the other hand, to improve the stirring performance, it is desirable to arrange the cup to be inclined.

Therefore, in the stirring apparatus for foods, it is desirable to use an endless conveyer as the conveyer of cups, rotate the cup by using a magnetic coupling, and arrange the cup to be inclined. However, in a stirring apparatus for foods which uses an endless conveyer, when the cup and the rotation driving device are connected via a magnetic coupling and the cup is inclined and attached to the endless conveyer which extends in the horizontal direction, a transmission mechanism such as a gear must be provided between the cup and the driven magnet to change the orientation of rotation. As a result, since the transmission mechanism and an antifouling member of the transmission mechanism are required, the cost increases and the maintainability deteriorates.

SUMMARY

According to an embodiment of the disclosure, a stirring apparatus for foods includes an endless conveyer, a plurality of cups, and a rotation mechanism. The endless conveyer has a conveying surface circulating in an endless manner and is arranged so that a longitudinal direction of the endless conveyer is inclined at a predetermined inclination angle with respect to a horizontal direction. Each cup has a bottom plate, a side plate surrounding a peripheral edge of the bottom plate, and an opening formed at an upper end of the side plate, and a main ingredient which is a food is fed into the cup. The rotation mechanism rotates the cup around a center line passing through a center of the bottom plate and a center of the opening. The cup is attached to the endless conveyer to be perpendicular to the conveying surface. The rotation mechanism includes a rotation shaft, a driven magnet, a driving magnet, and a rotation driving device. The rotation shaft has one end fixed to the bottom plate of the cup and the other end. The driven magnet is a permanent magnet provided at the other end of the rotation shaft. The driving magnet is a permanent magnet facing the driven magnet at a predetermined interval. The rotation driving device has an actuator which rotates the driving magnet.

In the stirring apparatus for foods according to an embodiment of the disclosure, the endless conveyer is provided to be inclined, and the cups are fixed to be perpendicular to the conveying surface of the endless conveyer. Therefore, the cups are also arranged to be inclined, and the stirring performance can be improved. Further, when rotating the cup, the rotational power can be transmitted in a non-contact manner by using the magnet coupling including the driven magnet and the driving magnet. At this time, since it is not required to provide a transmission mechanism to change the orientation of rotation, the configuration can be simplified.

DESCRIPTION OF THE EMBODIMENTS

An embodiment of the disclosure provides a stirring apparatus for foods in which the number of cups can be easily increased and stirring can be more appropriately performed by rotating the cup.

Hereinafter, an embodiment of the disclosure will be described with reference to the drawings. Various modification examples described below may be implemented in any combination.

The term "main ingredient" in this specification is a general term for foods which are first fed into a cup and is, for example, boiled noodles but is not limited thereto. The term "noodles" in this specification generally refers to foods made by kneading edible powder with water or the like to form, and includes udon noodles, buckwheat noodles, somen noodles, hiyamugi, Chinese noodles, pasta, rice noodles, and cellophane noodles. The term "boiled noodles" refers to noodles which have been boiled before being supplied to a stirring apparatus for foods. The ingredient mixed with the boiled noodles in the stirring apparatus for foods is broadly referred to as a "sub ingredient", and the sub ingredient also includes ingredients other than a loosening agent. Specifically, the sub ingredient includes water, edible oils and fats, seasonings and condiments (including spices, herbs, relishes), sauces (including those having solid substances), and food additives.

Figure 1:
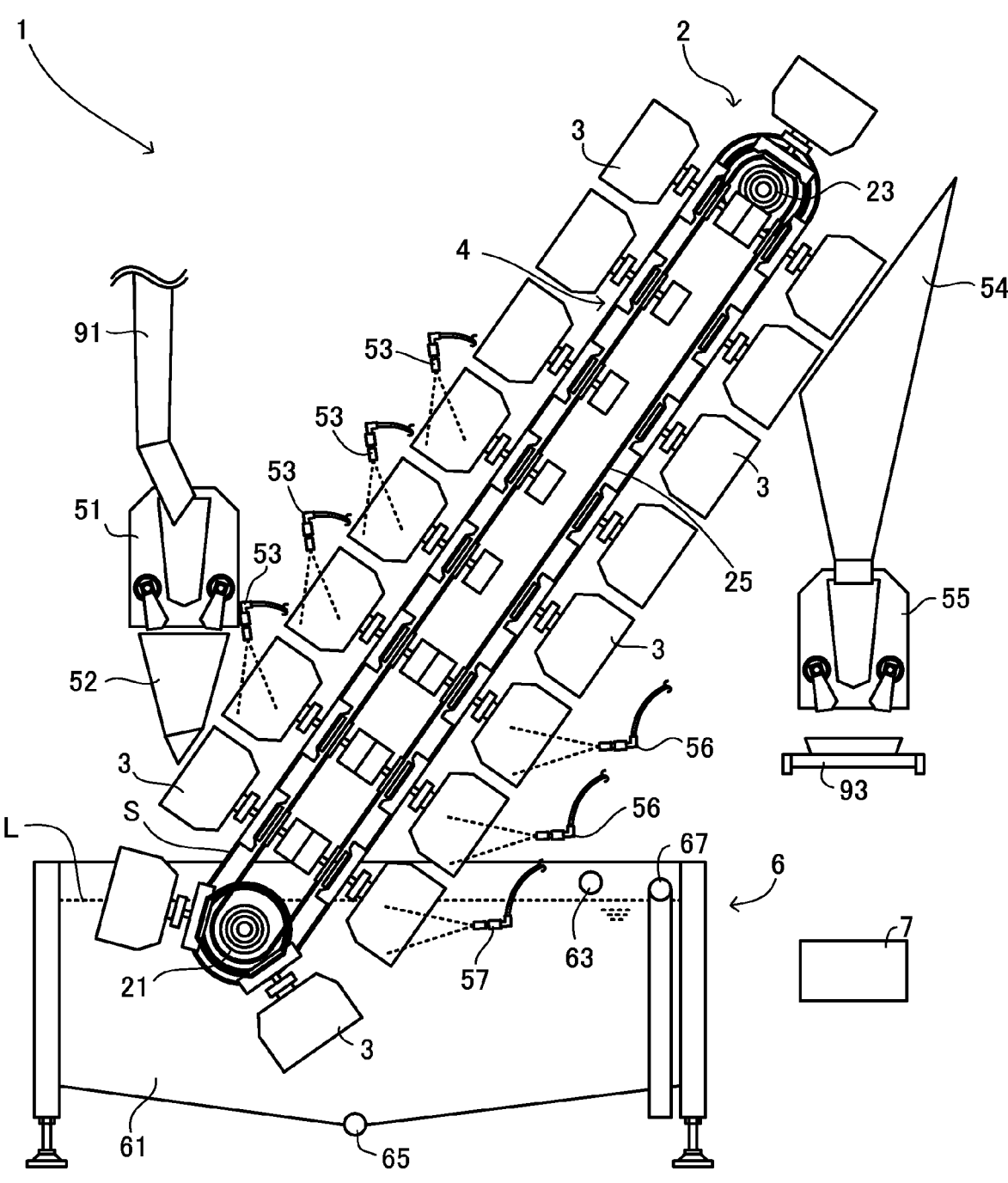
FIG. 1 is a schematic configuration view of a stirring apparatus for foods according to this embodiment.

The stirring apparatus 1 for foods is an apparatus which stirs and mixes the main ingredient supplied from a pre-process apparatus 91 together with the sub ingredient and discharges to a post-process apparatus 93. In particular, the stirring apparatus 1 for foods of this embodiment is a stirring apparatus for noodles which takes boiled noodles as the main ingredient. As shown in FIG. 1, the stirring apparatus 1 for foods of this embodiment includes an endless conveyer 2, a plurality of cups 3, a rotation mechanism 4, an inlet shutter 51, a feeding chute 52, an ingredient nozzle 53, a discharge chute 54, an outlet shutter 55, a cleaning nozzle 56, a drying nozzle 57, a cleaning device 6, and a controller 7.

The endless conveyer 2 is a device having a conveying surface S which circulates in an endless manner. In this embodiment, the endless conveyer 2 is specifically a chain conveyer and includes a pair of lower sprockets 21, a pair of upper sprockets 23 provided higher than the lower sprockets 21, and a pair of chains 25 respectively wound around the lower sprockets 21 and the upper sprockets 23. The region sandwiched between the pair of chains 25 forms the conveying surface S. The cup 3 is fixed to a mounting plate 27 installed on the pair of chains 25, and is intermittently moved and positioned on the conveying surface S. The endless conveyer 2 may also be another conveyer such as a belt conveyer as long as it has a conveying surface S which circulates in an endless manner. Since the size of the endless conveyer 2 can be easily increased, the number of the cups 3 to be conveyed can be increased. By providing a large number of cups 3, productivity can be improved. Also, it becomes easy to increase the number of sub ingredients, and it becomes possible to use the stirring apparatus 1 for foods to produce a wider variety of foods.

The endless conveyer 2 is arranged so that a longitudinal direction of the endless conveyer 2 is inclined with respect to the horizontal direction at a predetermined inclination angle θ. The inclined arrangement of the endless conveyer 2, in combination with the perpendicular arrangement of the cup 3 (to be described later), improves the stirring performance, and can also reduce the installation area in the horizontal direction. To improve the stirring performance, the cup 3 may face directly to the lateral side; that is, the inclination angle of the cup 3 may be close to 0°. On the other hand, to facilitate feeding of the main ingredient into the cup 3 and to prevent the main ingredient and the sub ingredient from leaking from the cup 3, the cup 3 being stirred needs to face upward to some extent. Based on the above, the inclination angle of the cup 3 arranged on the upper side of the endless conveyer 2 is configured to be, for example, 20° or more and 45° or less. In other words, the inclination angle θ of the endless conveyer 2 may be 45° or more and 70° or less. In this embodiment, the inclination angle θ of the endless conveyer 2 is about 55°. The endless conveyer 2 of this embodiment is inclined so that a side where the main ingredient is fed is at a low level and a side where the main ingredient and the sub ingredient are discharged is at a high level, but the endless conveyer 2 may also be inclined so that the side where the main ingredient is fed is at a high level and the side where the main ingredient and the sub ingredient are discharged is at a low level.

Figure 2:
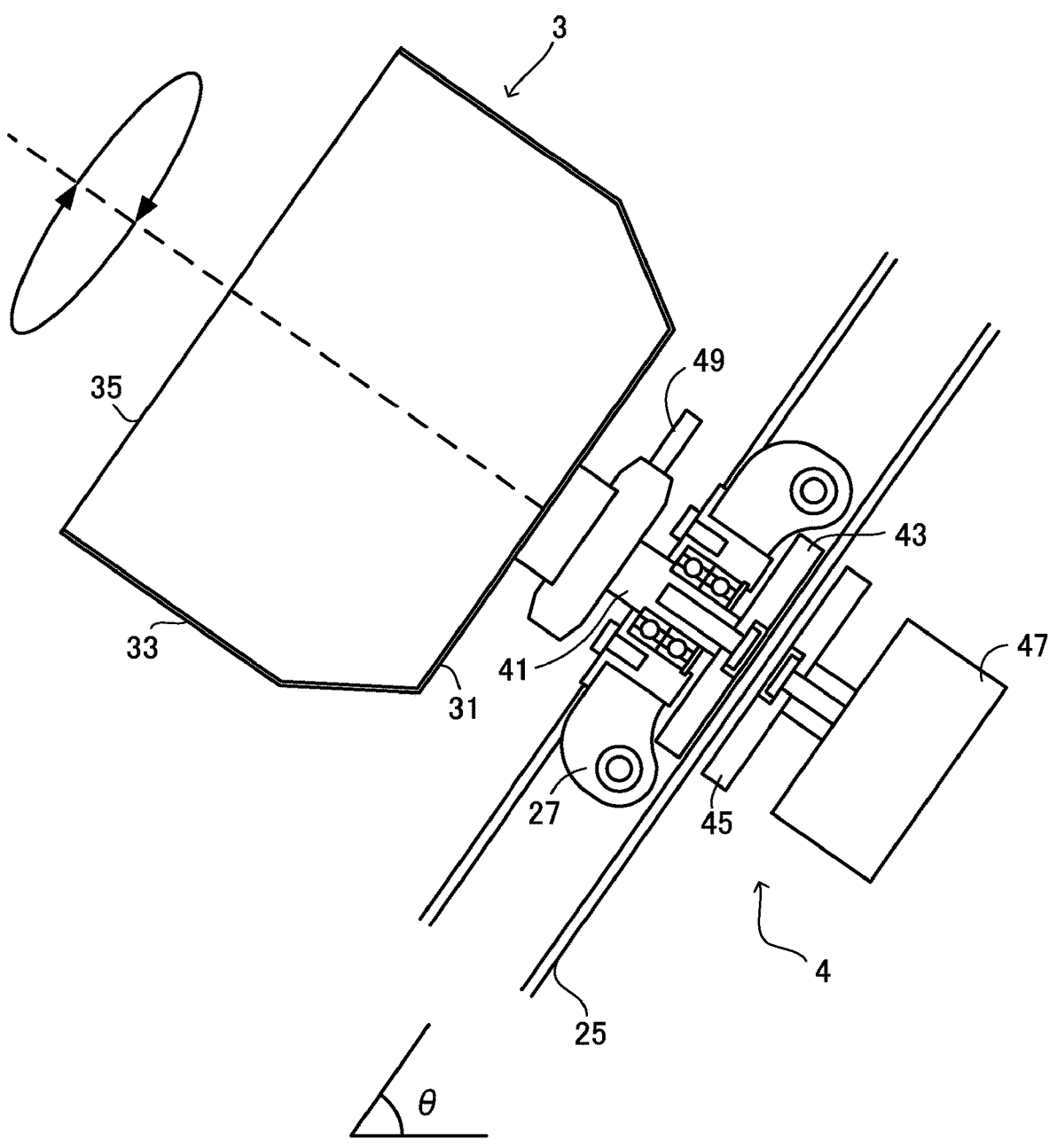
FIG. 2 is an enlarged view of a cup and a rotation mechanism.

The cup 3 is a container which is fed with the main ingredient and the sub ingredient and holds the main ingredient and the sub ingredient during stirring. A plurality of cups 3 are provided and attached to the endless conveyer 2 to be perpendicular to the conveying surface S at predetermined intervals. As described above, since the endless conveyer 2 is inclined at the predetermined inclination angle θ, and the cup 3 attached perpendicular to the conveying surface S is thus also inclined, the stirring performance is improved. That is, by arranging the cup 3 to be inclined, as the cup 3 rotates, the main ingredient located at the lower part inside the cup 3 is continuously brought upward and then drops by gravity. Accordingly, stirring can be performed efficiently. As shown in FIG. 2, the cup 3 includes a bottom plate 31, a side plate 33 surrounding the peripheral edge of the bottom plate 31, and an opening 35 formed at the upper end of the side plate 33.

The rotation mechanism 4 is a device which rotates the cup 3 to perform stirring. More specifically, the rotation mechanism 4 rotates the cup 3 about a center line passing through the center of the bottom plate 31 and the center of the opening 35. The center line of the cup 3 is perpendicular to the conveying surface S. As shown in FIG. 2, the rotation mechanism 4 includes a rotation shaft 41, a driven magnet 43, a driving magnet 45, and a rotation driving device 47. The rotation shaft 41 is pivotally supported by the mounting plate 27, and one end of the rotation shaft 41 is fixed to the bottom plate 31 of the cup 3. That is, the cup 3 is attached to the mounting plate 27 via the rotation shaft 41. When connecting the cup 3 and the rotation shaft 41, a fastening member 49 that can be easily fixed and released such as a clamp band may be used. By doing so, even if the cup 3 is to be removed at the time of maintenance or the like, the work can be easily performed. The driven magnet 43, which is a permanent magnet, is provided at the other end of the rotation shaft 41. The driving magnet 45 is a permanent magnet and faces the driven magnet 43 at a predetermined interval. That is, the driven magnet 43 and the driving magnet 45 form a magnet coupling. As the driving magnet 45 rotates, the driven magnet 43 is rotated by a magnetic force, and the cup 3 is rotated via the rotation shaft 41. The rotation driving device 47 is provided for each driving magnet 45. While the rotation driving device 47 may be a device having any actuator capable of rotating the driving magnet 45, as an example, the rotation driving device 47 may include a motor and a transmission mechanism which transmits the power of the motor to the driving magnet 45.

As described above, the rotation mechanism 4 of this embodiment is configured to be capable of transmitting rotational power in a non-contact manner by using a magnet coupling. Such a rotation mechanism 4 is excellent in that it is highly waterproof. Further, since the member connected to the chain 25 via the mounting plate 27 may be only the cup 3 and the driven elements of the rotation mechanism 4, the load on the endless conveyer 2 can be reduced. Further, the cup 3 can be easily removed from the apparatus, and maintainability is improved.

The rotation mechanism 4 may be configured to be capable of switching the rotation direction of the cup 3. By appropriately switching between forward rotation and reverse rotation of the cup 3, stirring can be performed more appropriately. Forward rotation and reverse rotation may be switched at each position of the cup 3, or forward rotation and reverse rotation may be switched at one position.

The driven elements of the rotation mechanism 4, i.e., the rotation shaft 41 and the driven magnet 43, are provided for each cup 3 and is fixed to the mounting plate 27 together with the cup 3. The driving elements of the rotation mechanism 4, i.e., the driving magnet 45 and the rotation driving device 47, are held on the inner side of the endless conveyer 2 via a support member (not shown) at each position where the cup 3 is positioned. The driving magnet 45 and the rotation driving device 47 may be provided only at positions where rotation of the cup 3 is required. In other words, the driving magnet 45 and the rotation driving device 47 do not need to be provided at all the positions where the cup 3 is positioned.

Figure 3:
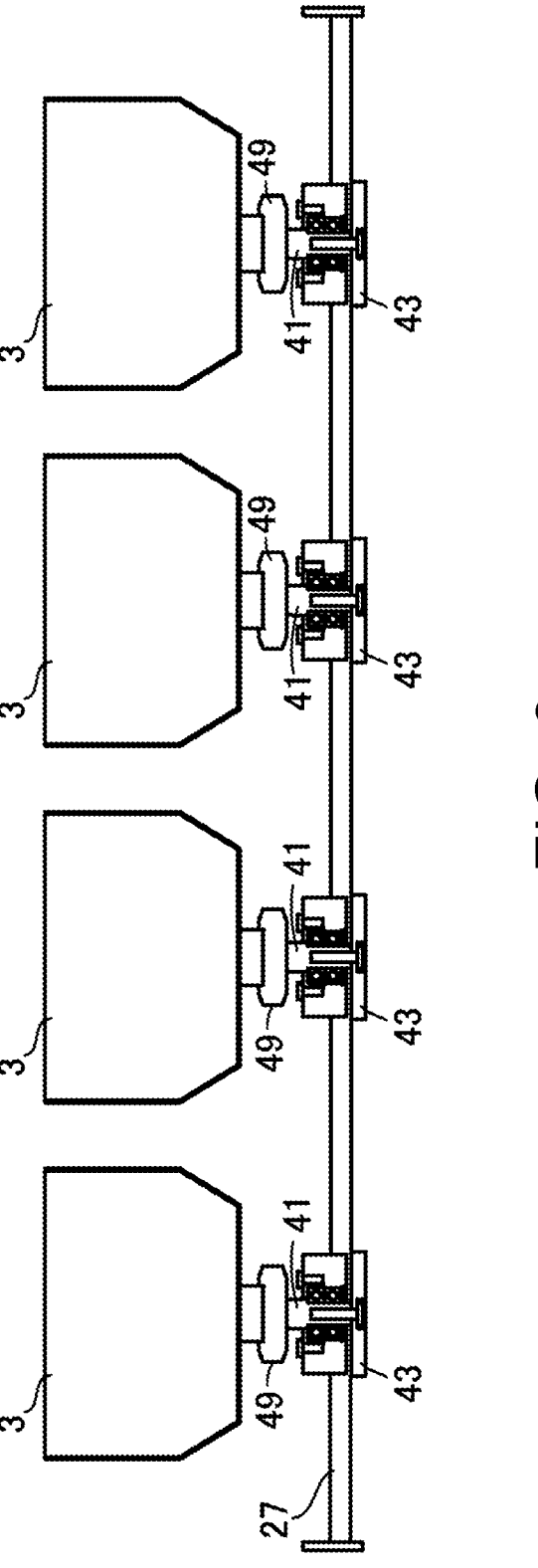
FIG. 3 shows an example of arranging the cup to a mounting plate.

With the mounting plate 27 to which the cup 3, the rotation shaft 41, and the driven magnet 43 are fixed being taken as one set, a plurality of mounting plates 27 are installed on the pair of chains 25 at predetermined intervals. As shown in FIG. 3, a plurality of cups 3, rotation shafts 41, and driven magnets 43 may be fixed to one mounting plate 27. By doing so, the number of the cups 3 can be further increased. When a plurality of cups 3, rotation shafts 41, and driven magnets 43 are attached to one mounting plate 27 in this manner, the numbers of other devices such as the driving magnet 45, the rotation driving device 47, the inlet shutter 51, the feeding chute 52, the ingredient nozzle 53, the discharge chute 54, the outlet shutter 55, the cleaning nozzle 56, and the drying nozzle 57 are also increased as appropriate according to the number of the cups 3.

Figure 4:
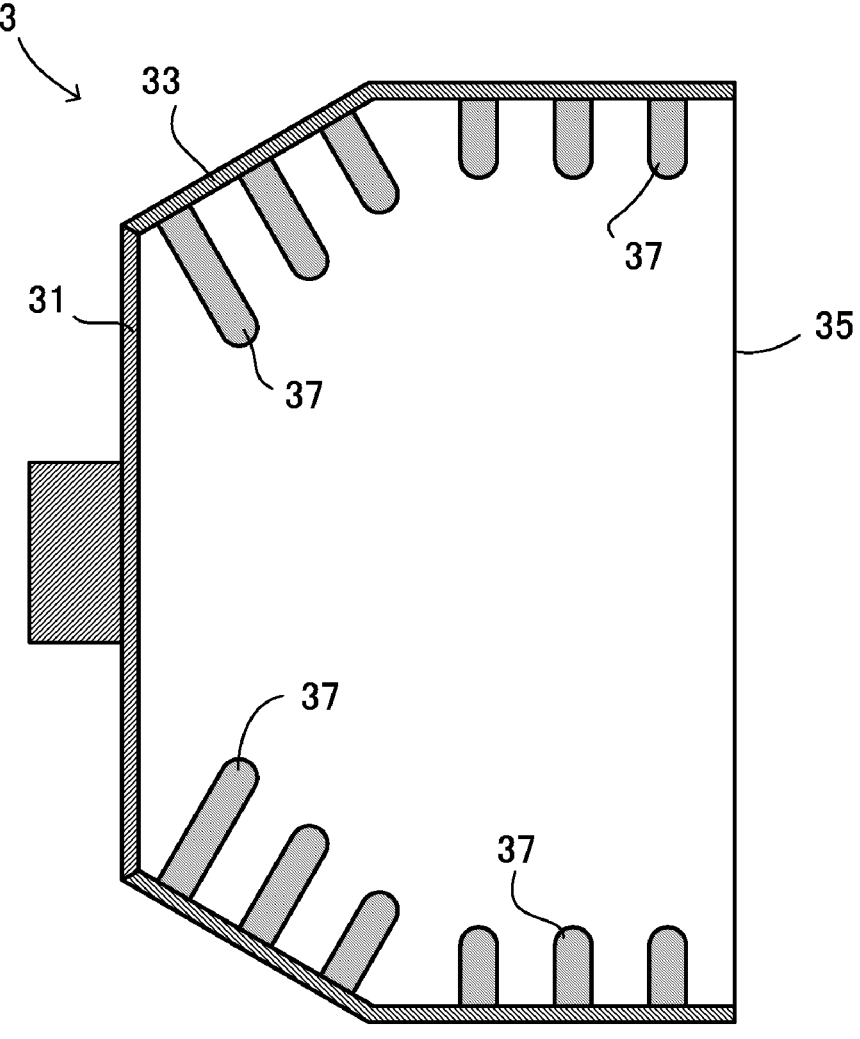
FIG. 4 shows an example of the cup.
Figure 5:
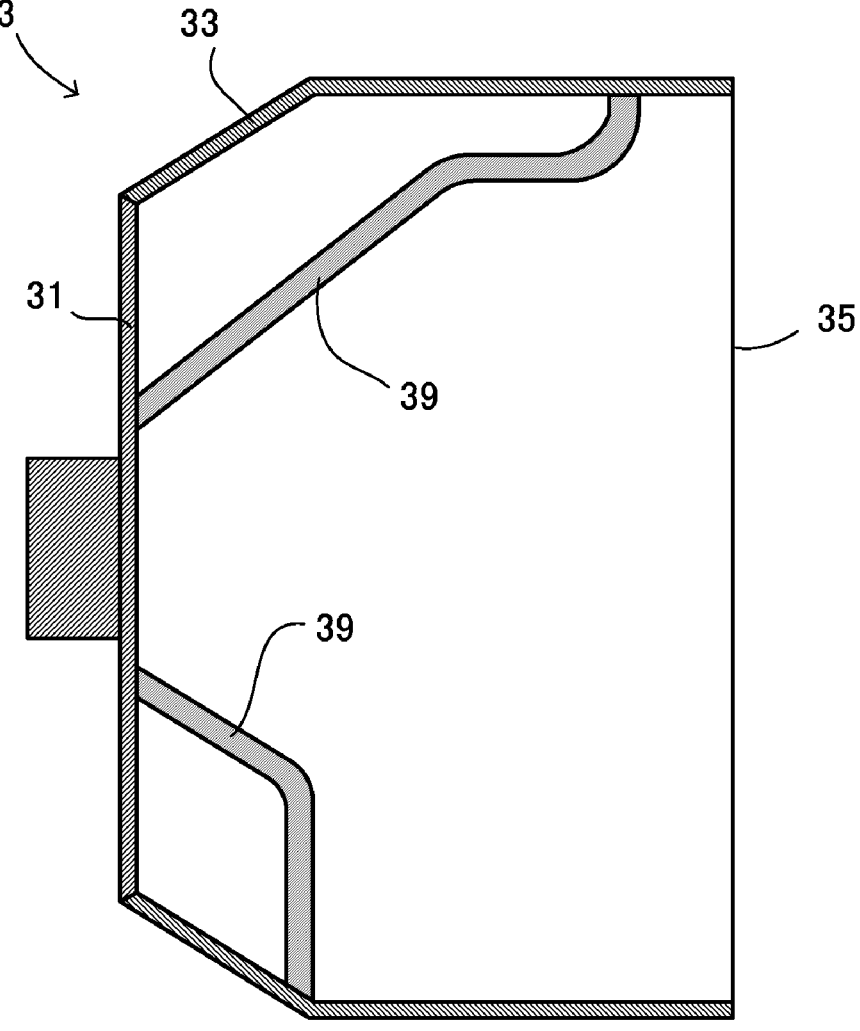
FIG. 5 shows an example of the cup.
Figure 6:
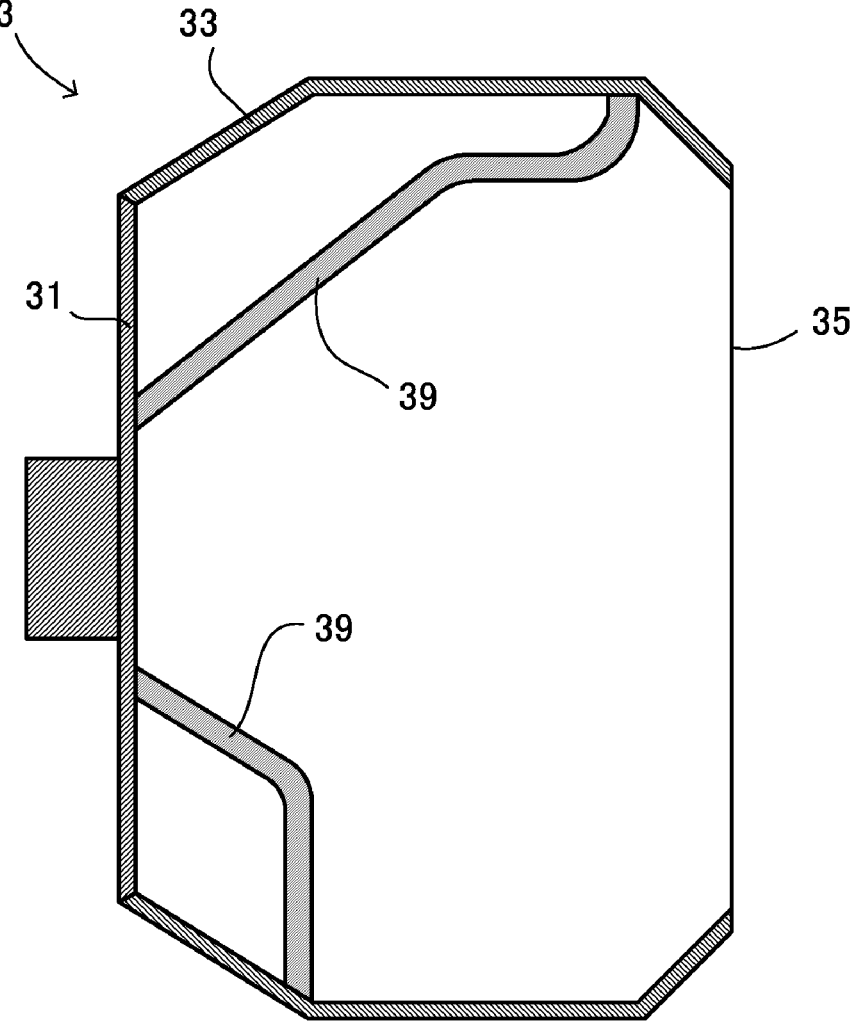
FIG. 6 shows an example of the cup.

The cup 3 may have a simple cylindrical shape, but as shown in FIG. 4 to FIG. 6, at least one of the bottom plate 31 side and the opening 35 side of the side plate 33 may be inclined inward. By inclining the side plate 33 on the bottom plate 31 side inward, the stirring performance can be improved. By inclining the side plate 33 on the opening 35 side inward, the main ingredient and the sub ingredient can be prevented from leaking from the cup 3. To appropriately stir and efficiently mix the main ingredient and the sub ingredient, an obstacle which collides with the main ingredient as the main ingredient moves may be provided inside the cup 3. For example, rod-shaped protrusions 37 may be provided as shown in FIG. 4, or flat plate-shaped blades 39 may be provided as shown in FIG. 5 and FIG. 6.

Figure 7:
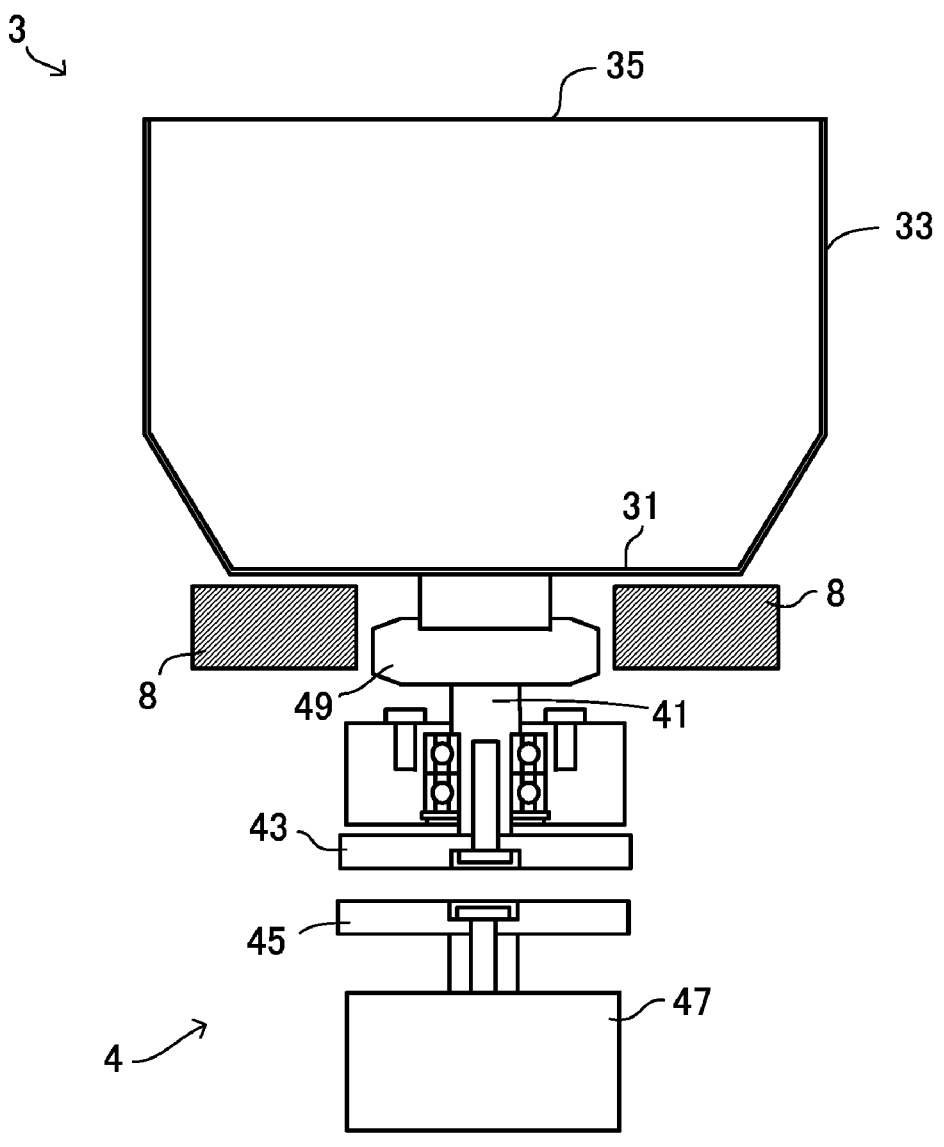
FIG. 7 is a schematic configuration view of a stirring apparatus for foods including a heater.

The stirring apparatus 1 for foods may further include a heater 8 configured to be capable of heating the cup 3. As shown in FIG. 7, specifically, the heater 8 of this embodiment is provided below the cup 3 in close proximity to the bottom plate 31, and is fixed at a predetermined position via a support member (not shown). The cup 3 is conveyed by the endless conveyer 2 in a direction from the front to the back of the drawing in FIG. 7, and the heater 8 is arranged avoiding the center of the cup 3 so as not to interfere with the rotation mechanism 4 during conveyance. The heater 8 may be provided only at positions where heating of the cup 3 is required; that is, the heater does not need to be provided at all positions where the cup 3 is positioned. While various types of heaters may be adopted as the heater 8 as long as the cup 3 can be heated, it is desirable to adopt a heater 8 capable of non-contact heating, such as an induction heater, a gas burner, and a radiation heater. By using the non-contact type heater 8, the position of the heater 8 can be fixed, and it is not necessary to move the heater 8 during heating. By providing the heater 8, stirring can be performed while heating and cooking, and the application of the stirring apparatus 1 for foods can be expanded. In the rotation mechanism 4 of this embodiment, since the heat generated on the driven elements is not directly transmitted to the driving elements, and the magnet coupling has high heat resistance, there is little possibility that a problem will occur even if the cup 3 is heated.

The cup 3 is intermittently conveyed and positioned at predetermined positions on the conveying surface S, and in the following, in particular, a position where a predetermined operation is performed during production on the cup 3 set on the conveying surface S will be referred to as a cup position. In this embodiment, the cup position includes a main ingredient feeding position where the main ingredient is fed into the cup 3, a sub ingredient feeding position where the sub ingredient is fed into the cup 3, a stirring position where the main ingredient and the sub ingredient are mixed and stirred, a discharge position where the main ingredient and the sub ingredient are discharged from the cup 3, a cleaning position where the cup 3 is cleaned, and a drying position where the cup 3 is dried.

The inlet shutter 51 and the feeding chute 52 are provided above the main ingredient feeding position. The inlet shutter 51 is a shutter capable of temporarily blocking the main ingredient supplied from the pre-process apparatus 91. The inlet shutter 51 of this embodiment includes a cylinder through which the main ingredient passes, a pair of closing members which swing to open and close the bottom of the cylinder, and a driving device which swings the closing members. Instead of this, various types of shutters such as a slide type and a rotation type may be adopted as the inlet shutter 51. In this embodiment, the inlet shutter 51 is provided above the feeding chute 52, but the inlet shutter 51 may also be provided below or inside the feeding chute 52. The feeding chute 52 is provided above one end side of the endless conveyer 2 and guides the main ingredient supplied from the pre-process apparatus 91 to the cup 3 at the main ingredient feeding position.

In the stirring apparatus 1 for foods of this embodiment, since the endless conveyer 2 is provided to be inclined, depending on the positional relationship with the pre-process apparatus 91, the main ingredient may be dropped to the stirring apparatus 1 for foods from a relatively high position. By temporarily blocking and then dropping the main ingredient with the inlet shutter 51 at a position close to the cup 3, it is possible to prevent applying a load to the cup 3 and the rotation mechanism 4 and prevent the main ingredient from overflowing from the cup 3. The timing of feeding the main ingredient into the cup 3 may also be adjusted.

Feeder such as the ingredient nozzle 53 may be provided near the main ingredient feeding position to supply the sub ingredient to the cup 3 also at the main ingredient feeding position. The driving magnet 45 and the rotation driving device 47 may be provided at the main ingredient feeding position to rotate the cup 3 also at the main ingredient feeding position. When the main ingredient is, for example, boiled noodles, the boiled noodles may be more appropriately loosened by stirring also at the main ingredient feeding position.

The ingredient nozzle 53 is provided near the sub ingredient feeding position. The ingredient nozzle 53 supplies the sub ingredient to the cup 3 at the sub ingredient feeding position. Depending on the type of the sub ingredient, another type of feeder such as a chute may be provided instead of the ingredient nozzle 53. Depending on the number of the sub ingredients, the sub ingredient feeding position may be set at a plurality of locations. The ingredient nozzle 53 is connected to an ingredient tank (not shown) and a pump (not shown) via an on-off valve (not shown), and is configured to be switchable between supply start and supply stop of the sub ingredient at a desired timing.

The driving magnet 45 and the rotation driving device 47 may be provided at the sub ingredient feeding position to rotate the cup 3 also at the sub ingredient feeding position.

The driving magnet 45 and the rotation driving device 47 are provided at the stirring position. The cup 3 at the stirring position is rotated to mix and stir the main ingredient and the sub ingredient. While it is optional to set the stirring position if stirring is performed also at the sub ingredient feeding position, by providing one or more stirring positions, stirring can be more appropriately performed.

The discharge chute 54 and the outlet shutter 55 are provided below the discharge position. The discharge chute 54 is provided below the other end side of the endless conveyer 2 and guides the main ingredient and the sub ingredient discharged from the cup 3 at the discharge position to the post-process apparatus 93. The outlet shutter 55 is a shutter capable of temporarily blocking the main ingredient and the sub ingredient supplied from the cup 3. The outlet shutter 55 of this embodiment includes a cylinder through which the main ingredient and the sub ingredient pass, a pair of closing members which swing to open and close the bottom of the cylinder, and a driving device which swings the closing members. Instead of this, various types of shutters such as a slide type and a rotation type may be adopted as the outlet shutter 55. In this embodiment, the outlet shutter 55 is provided below the discharge chute 54, but the outlet shutter 55 may also be provided above or inside the discharge chute 54.

In the stirring apparatus 1 for foods of this embodiment, since the endless conveyer 2 is provided to be inclined, depending on the positional relationship with the post-process apparatus 93, the main ingredient and the sub ingredient may be dropped to the post-process apparatus 93 from a relatively high position. By temporarily blocking and then dropping the main ingredient and the sub ingredient with the outlet shutter 55 at a position close to the post-process apparatus 93, it is possible to prevent the main ingredient and the sub ingredient from overflowing from the container or the like installed in the post-process apparatus 93. The timing of discharging the main ingredient and the sub ingredient to the post-process apparatus 93 may also be adjusted.

The driving magnet 45 and the rotation driving device 47 may be provided at the discharge position to rotate the cup 3 also at the discharge position.

The cleaning nozzle 56 is provided near the cleaning position. The cleaning nozzle 56 ejects a cleaning liquid to the cup 3 at the cleaning position to clean the cup 3. The cleaning liquid is, for example, water, a detergent, or boiling water. A plurality of types of cleaning liquids may be used in alternation, or different cleaning liquids may be used depending on the cleaning position. It is optional to set the cleaning position, but by providing one or more cleaning positions, production can be performed more hygienically. The cleaning nozzle 56 is connected to a cleaning liquid source (not shown) via an on-off valve (not shown), and is configured to be switchable between ejection start and ejection stop of the cleaning liquid at a desired timing.

The driving magnet 45 and the rotation driving device 47 may be provided at the cleaning position to rotate the cup 3 also at the cleaning position.

The drying nozzle 57 is provided near the drying position. The drying nozzle 57 ejects gas to the cup 3 at the drying position to dry the cup 3. The gas is, for example, high pressure air or warm air. It is optional to set the drying position, but by providing one or more drying positions, it is possible to prevent the cleaning liquid used for cleaning from remaining in the cup 3. The drying nozzle 57 is connected to a gas source (not shown) via an on-off valve (not shown), and is configured to be switchable between ejection start and ejection stop of the gas at a desired timing.

The driving magnet 45 and the rotation driving device 47 may be provided at the drying position to rotate the cup 3 also at the drying position.

The cleaning device 6 is provided below the endless conveyer 2 and is a device for cleaning the cup 3 during non-production time. The cleaning device 6 includes a cleaning tank 61, a supply port 63 for supplying a cleaning liquid L to the cleaning tank 61, a discharge port 65 for discharging the cleaning liquid L from the cleaning tank 61, and an overflow port 67 for keeping the water level of the cleaning liquid L in the cleaning tank 61 constant. When the cleaning device 6 is used, the cleaning liquid L is stored in the cleaning tank 61 up to a water level at which at least one cup 3 conveyed by the endless conveyer 2 is immersed. The cleaning liquid L may be, for example, boiling water, and the cleaning device 6 may be a device for boiling and sterilizing the cup 3. When boiling water is used as the cleaning liquid L, the cleaning tank 61 may be provided with a heater for heating water, or water heated outside the device may be supplied to the cleaning device 6. A detergent may also be used as the cleaning liquid L instead of boiling water. The cleaning device 6 is not used during production time, i.e., when mixing and stirring the main ingredient and the sub ingredient. In other words, the cleaning liquid L is not stored in the cleaning tank 61 during production time.

The controller 7 operates the stirring apparatus 1 for foods to perform various controls. Specifically, the controller 7 drives the endless conveyer 2 to position the cup 3, and drives the rotation mechanism 4 to rotate the cup 3. The controller 7 controls the inlet shutter 51 and the outlet shutter 55 to drop the main ingredient and discharge the main ingredient and the sub ingredient. The controller 7 controls the ingredient nozzle 53, the cleaning nozzle 56, and the drying nozzle 57 respectively to supply the sub ingredient, clean the cup 3, and dry the cup 3. The controller 7 may be configured by any combination of hardware and software as long as the desired control is realized.

Herein, a stirring method of the above-described stirring apparatus 1 for foods of this embodiment will be described. In this embodiment, the cup 3 is sequentially positioned at the main ingredient feeding position, the sub ingredient feeding position, the stirring position, the discharge position, the cleaning position, and the drying position. Although the operations at the respective positions are performed in parallel, in the following description, the operations will be described focusing on one cup 3.

First, the main ingredient is fed from the pre-process apparatus 91 into the cup 3 positioned at the main ingredient feeding position via the inlet shutter 51 and the feeding chute 52. At this time, the sub ingredient may also be fed into the cup 3 via the ingredient nozzle 53 or the like. The cup 3 may be rotated also at the main ingredient feeding position. After lapse of a predetermined time, the cup 3 is moved to the next position by the endless conveyer 2.

Next, the sub ingredient is fed into the cup 3 positioned at the sub ingredient feeding position via the ingredient nozzle 53 or the like. The cup 3 is rotated by the rotation mechanism 4 to mix and stir the main ingredient and the sub ingredient. After lapse of a predetermined time, if a plurality of sub ingredient feeding positions are provided, the same operation is performed at the next sub ingredient feeding position. After finishing the operations at all the sub ingredient feeding positions, the cup 3 is moved to the next position by the endless conveyer 2.

The cup 3 positioned at the stirring position is rotated by the rotation mechanism 4 to mix and stir the main ingredient and the sub ingredient. After lapse of a predetermined time, if a plurality of stirring positions are provided, the same operation is performed at the next stirring position. After finishing the operations at all the stirring positions, the cup 3 is moved to the next position by the endless conveyer 2.

Since the opening 35 of the cup 3 positioned at the discharge position faces downward, the main ingredient and the sub ingredient are discharged from the cup 3. At this time, to facilitate the discharge, the cup 3 may be rotated by the rotation mechanism 4. The main ingredient and the sub ingredient discharged from the cup 3 are sent to the post-process apparatus 93 via the discharge chute 54 and the outlet shutter 55. After lapse of a predetermined time, the cup 3 is moved to the next position by the endless conveyer 2.

After the main ingredient and the sub ingredient are discharged, the cup 3 positioned at the cleaning position is cleaned. At the cleaning position, the cleaning liquid is ejected from the cleaning nozzle 56 to the cup 3 to wash away dirtiness adhering to the cup 3. At this time, the rotation mechanism 4 may rotate the cup 3 so that the cleaning liquid is evenly applied to the inside of the cup 3. After lapse of a predetermined time, the cup 3 is moved to the next position by the endless conveyer 2.

After cleaning, the cup 3 positioned at the drying position is dried. At the drying position, gas is ejected from the drying nozzle 57 to the cup 3 to dry the water adhering to the cup 3. At this time, the rotation mechanism 4 may rotate the cup 3 so that the gas is evenly applied to the inside of the cup 3. After lapse of a predetermined time, the cup 3 is moved to the next position by the endless conveyer 2.

The above operation is repeated, and the main ingredient and the sub ingredient are continuously stirred and mixed. It is not necessary to particularly operate the cup 3 from the discharge position to the cleaning position and from the drying position to the main ingredient feeding position.

After the production, the cups 3 may be cleaned by using the cleaning device 6. For example, by storing boiling water as the cleaning liquid L in the cleaning tank 61 and driving the endless conveyer 2, the cups 3 continuously pass through the boiling water. In this manner, the cups 3 can be cleaned without being removed.

As specifically shown in the examples above, the disclosure is not limited to the configuration of the embodiment shown in the drawings, but various modifications or applications are possible without departing from the technical concept of the disclosure.

What is claimed is:

1. A stirring apparatus for foods comprising:

an endless conveyer which has a conveying surface circulating in an endless manner and is arranged so that a longitudinal direction of the endless conveyer is inclined at a predetermined inclination angle with respect to a horizontal direction;

a plurality of cups each having a bottom plate, a side plate surrounding a peripheral edge of the bottom plate, and an opening formed at an upper end of the side plate, wherein a main ingredient which is a food is fed into the cup; and a rotation mechanism which rotates each cup around a center line passing through a center of the bottom plate and a center of the opening of the cup at rotational positions, wherein the plurality of cups is provided along the longitudinal direction and a lateral direction of the endless conveyer and is attached to the endless conveyer to be perpendicular to the conveying surface, and the rotation mechanism comprises:

a plurality of driven elements moving along the longitudinal direction of the endless conveyer; and a plurality of driving elements fixed on the rotational positions along the longitudinal direction of the endless conveyer, each of the plurality of driving elements is configured to drive the plurality of driven elements moving thereabove, and each of the plurality of driven elements comprises:

a rotation shaft having one end fixed to the bottom plate of one of the plurality of cups; and a driven magnet being a permanent magnet provided at the other end of the rotation shaft and each of the plurality of driving elements comprises:

a driving magnet being a permanent magnet configured to face the driven magnet positioned above the driving magnet at a predetermined interval; and a rotation driving device having an actuator configured to rotate the driving magnet, and wherein a plurality of rotation driving devices and a plurality of driving magnets are disposed at a plurality of positions on an inner side of the endless conveyer opposite to the conveying surface for rotating the plurality of cups, the plurality of rotation driving devices and the plurality of driving magnets have a one-to-one relationship such that a number of the plurality of rotation driving devices is identical to a number of the plurality of driving magnets, and the number of the plurality of rotation driving devices and the number of the plurality of driving magnets are configured to be increased as a number of the plurality of cups in the lateral direction of the endless conveyer is increased.

2. The stirring apparatus for foods according to claim 1, wherein the predetermined inclination angle is 45° or more and 70° or less.

3. The stirring apparatus for foods according to claim 1, wherein the endless conveyer comprises:

a pair of lower sprockets;

a pair of upper sprockets provided higher than the pair of lower sprockets;

a pair of chains respectively wound around the pair of lower sprockets and the pair of upper sprockets; and a plurality of mounting plates installed on the pair of chains, wherein the cup, the rotation shaft, and the driven magnet are fixed to the mounting plate.

4. The stirring apparatus for foods according to claim 1, further comprising:

a feeding chute provided above one end side of the endless conveyer and guiding the main ingredient to each cup; and a discharge chute provided below the other end side of the endless conveyer and guiding the main ingredient discharged from the cup.

5. The stirring apparatus for foods according to claim 4, further comprising:

an inlet shutter provided above, below, or inside the feeding chute and configured to be openable and closable; and an outlet shutter provided above, below, or inside the discharge chute and configured to be openable and closable.

6. The stirring apparatus for foods according to claim 1, further comprising a cleaning nozzle which ejects a cleaning liquid to each cup to clean the cup.

7. The stirring apparatus for foods according to claim 6, further comprising a drying nozzle which ejects gas to each cup to dry the cup.

8. The stirring apparatus for foods according to claim 1, further comprising a cleaning device which is provided below the endless conveyer and comprises a cleaning tank configured to be capable of storing a cleaning liquid up to a water level at which at least one of the plurality of cups conveyed by the endless conveyer is immersed.

9. The stirring apparatus for foods according to claim 1, further comprising a heater which heats the plurality of cups.

10. The stirring apparatus for foods according to claim 1, wherein the main ingredient is boiled noodles.

* * * * *